(12) United States Patent
Wakiyama

(10) Patent No.: US 11,835,943 B2
(45) Date of Patent: Dec. 5, 2023

(54) RECORDING/PLAYBACK DEVICE AND RECORDING/PLAYBACK METHOD

(71) Applicant: Roland Corporation, Shizuoka (JP)

(72) Inventor: Mitsuhiro Wakiyama, Shizuoka (JP)

(73) Assignee: Roland Corporation, Shizuoka (JP)

( * ) Notice: Subject to any disclaimer, the term of this patent is extended or adjusted under 35 U.S.C. 154(b) by 30 days.

(21) Appl. No.: 17/622,854

(22) PCT Filed: Jul. 9, 2019

(86) PCT No.: PCT/JP2019/027194
§ 371 (c)(1),
(2) Date: Dec. 26, 2021

(87) PCT Pub. No.: WO2021/005724
PCT Pub. Date: Jan. 14, 2021

(65) Prior Publication Data
US 2022/0244715 A1 Aug. 4, 2022

(51) Int. Cl.
*G05B 19/42* (2006.01)
*G10H 1/00* (2006.01)
*G11B 27/036* (2006.01)

(52) U.S. Cl.
CPC ........... *G05B 19/42* (2013.01); *G10H 1/0008* (2013.01); *G11B 27/036* (2013.01)

(58) Field of Classification Search
CPC ..... G05B 19/43; G10H 1/0008; G11B 27/036
See application file for complete search history.

(56) References Cited

U.S. PATENT DOCUMENTS

2017/0025107 A1* 1/2017 Packouz ................ G10H 1/348
2017/0025108 A1 1/2017 Packouz

FOREIGN PATENT DOCUMENTS

| EP | 3203466 | 8/2017 |
| JP | H06348260 | 12/1994 |
| JP | 2002221964 | 8/2002 |

(Continued)

OTHER PUBLICATIONS

"International Search Report (Form PCT/ISA/210) of PCT/JP2019/027194," dated Sep. 24, 2019, with English translation thereof, pp. 1-4.

(Continued)

*Primary Examiner* — Girumsew Wendmagegn
(74) *Attorney, Agent, or Firm* — JCIPRNET

(57) ABSTRACT

The present invention enables diverse expression in a recording/playback device and a recording/playback method that can perform overdubbing. Provided is a recording/playback device and a recording/playback method that stores an inputted voice and plays back the stored voice. The recording/playback device has: a determination means that sets timepoints using sequentially acquired instructions as a trigger; a recording control means that records a voice inputted during the period from a first timepoint to a second timepoint as a first voice, and records a voice inputted during the period from a third timepoint to a fourth timepoint as a second voice; and a playback control means that starts loop playback of the first voice from the second timepoint and stops the loop playback at the third timepoint, and starts loop playback of the second voice from the fourth timepoint.

18 Claims, 14 Drawing Sheets

(56) References Cited

FOREIGN PATENT DOCUMENTS

| | | |
|---|---|---|
| JP | 2006023569 | 1/2006 |
| JP | 3827820 | 9/2006 |
| JP | 2009300904 | 12/2009 |
| JP | 2011112679 | 6/2011 |
| JP | 2013050530 | 3/2013 |
| JP | 2015075661 | 4/2015 |
| JP | 2016071031 | 5/2016 |
| JP | 2016180947 | 10/2016 |

OTHER PUBLICATIONS

Anonymous, "RC-300 Loop Station Owner's Manual," Jan. 2011, pp. 1-48, Available at: https://static.roland.com/assets/media/pdf/RC-300_e03_w.pdf.

"Search Report of Europe Counterpart Application", dated Dec. 23, 2022, p. 1-p. 11.

* cited by examiner

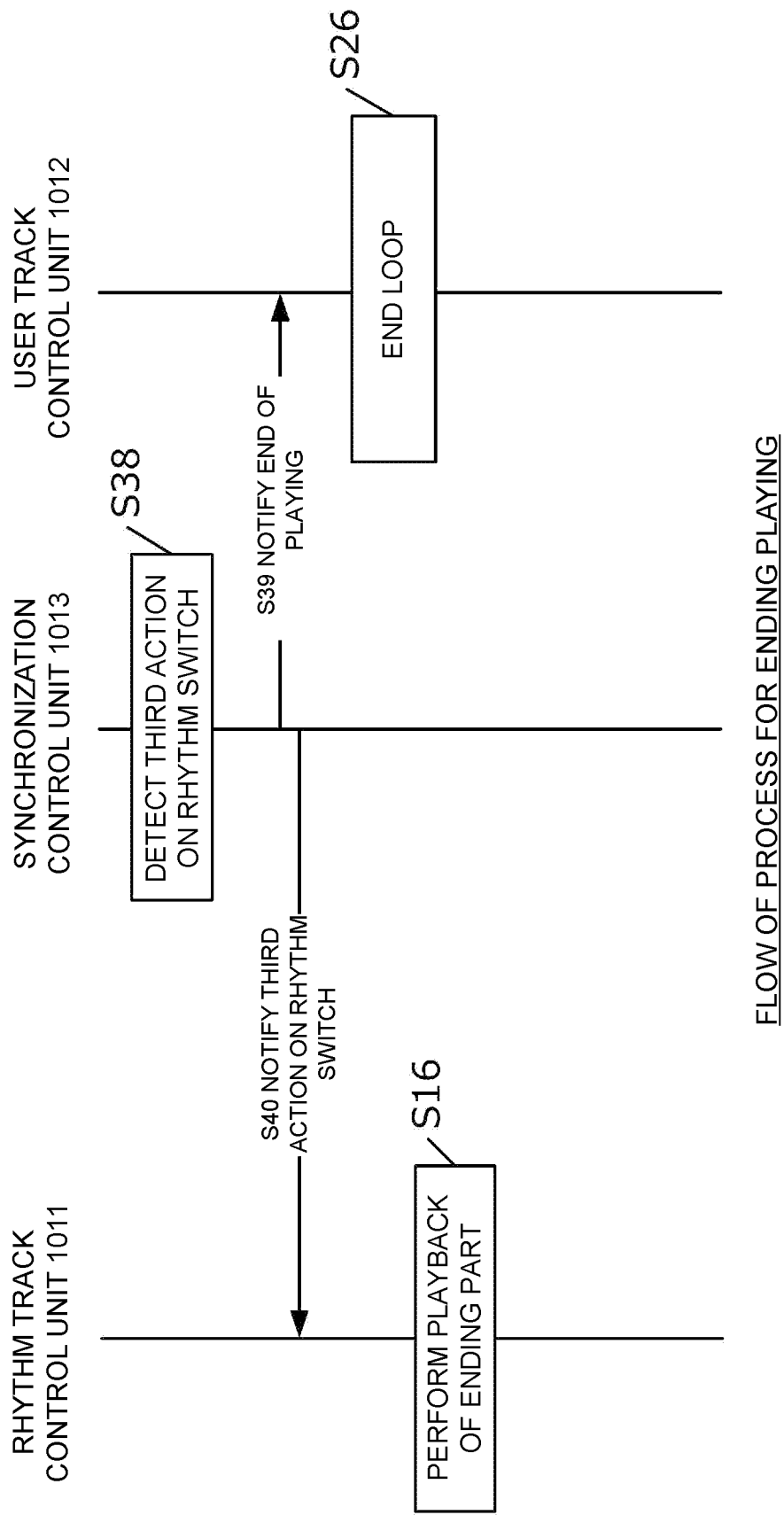

RECORDING/PLAYBACK DEVICE AND RECORDING/PLAYBACK METHOD

CROSS-REFERENCE TO RELATED APPLICATION

This application is a 371 application of the International PCT application serial no. PCT/JP2019/027194, filed on Jul. 9, 2019. The entirety of the above-mentioned patent application is hereby incorporated by reference herein and made a part of this specification.

TECHNICAL FIELD

The present invention relates to a recording/playback device and a recording/playback method that record and play backs musical sounds.

BACKGROUND ART

A looper/effector (hereinafter referred to as a looper) that records a played musical sound and is capable of acquiring a so-called sound-on-sound effect by newly superimposing a sound while playing back the musical sound is known. The looper enables a user to enjoy overdubbing and a jam session alone, and thus its popularity is rising.

As a technology relating to this, for example, in Patent Literature 1, a recording/playback device that records a musical sound signal in a different storage area for each loop and enables free selection of a musical sound after play is disclosed.

CITATION LIST

Patent Literature

[Patent Literature 1]
Japanese Patent No. 3827820

SUMMARY OF INVENTION

Technical Problem

The recording/playback device disclosed in Patent Literature 1 can record a plurality of phrases in a predetermined storage area.

Meanwhile, in an existing looper, recording and playback only for one section can be performed, and a musical piece composed to include different sections like a verse/chorus form cannot be played.

The present invention is in consideration of the problems described above, and an objective thereof is to enable diverse expressions of a recording/playback device capable of overdubbing.

Solution to Problem

A recording/playback device according to the present invention is a recording/playback device and a recording/playback method that control recording and playback of input voices on the basis of instructions performed by a user.

More specifically, the recording/playback device includes: a recording means configured to store input voices; a playback means configured to play back the stored voices; a determination means configured to determine timepoints, as triggers, using instructions that are sequentially acquired; a recording control means configured to record a voice input between a first timepoint and a second timepoint as a first voice and record a voice input between a third timepoint and a fourth timepoint as a second voice; and a playback control means configured to start loop playback of the first voice from the second timepoint, stop the loop playback of the first voice at the third timepoint, and start loop playback of the second voice from the fourth timepoint.

The recording/playback method includes: a recording step, storing input voices; a playback step, playing back the stored voices; a determination step, determining timepoints, as triggers, by using instructions that are sequentially acquired; a recording control step, recording a voice input between a first timepoint and a second timepoint as a first voice and recording a voice input between a third timepoint and a fourth timepoint as a second voice; and a playback control step, starting loop playback of the first voice from the second timepoint, stopping the loop playback of the first voice at the third timepoint, and starting loop playback of the second voice from the fourth timepoint.

The recording/playback device according to the present invention generates first to fourth timepoints on the basis of operations performed by the user and performs switching between a phase in which recording is performed and a phase in which playback is performed in accordance with the timepoints.

The first and third timepoints are timepoints for starting recording, and the second and fourth timepoint are timepoints for starting loop playback. Recording/playback of the first voice starts at the first and second timepoints, and recording/playback of the second voice starts at the third and fourth timepoints. In this way, the first voice and the second voice are separated, and timepoints for starting recording and starting playback can be instructed for each voice, and thus a musical piece having different sections such as a verse and a bridge or a verse and a chorus can be recorded and played back.

In addition, the determination means may acquire operations, as the instructions, performed by a user on an operator. For example, it is preferable that the operator be a foot pedal or the like that can be operated while playing an instrument, but the operator is not limited thereto.

In addition, the playback control means, at a fifth timepoint, may stop the loop playback of the second voice and start the loop playback of the first voice.

According to such a configuration, going back and forth between different sections such as a verse part and a chorus part can be performed.

In addition, the recording control means may record a voice input during the loop playback of the first voice as a third voice at least until the loop playback of the first voice is performed once.

By performing recording of the third voice in synchronization with the playback of the first voice, overlapping of the voices can be performed. Loop playback of the recorded third voice may be performed with the third voice mixed with the first voice.

In addition, a first phrase voice having a predetermined length may be stored in advance, and the determination means may determine the first timepoint on the basis of the acquired instruction and the length of the first phrase voice.

The first phrase voice, for example, is a rhythm pattern played by a percussion instrument or the like but is not limited thereto.

In a case in which playing starts with the first phrase voice used as an intro, by determining the first timepoint on the basis of the length of the first phrase voice, an operation of completing playback of the intro and starting recording at a timepoint at which a main phrase starts can be performed.

In addition, a second phrase voice having a predetermined length may be stored in advance, and the playback control means may start playback of the second phrase voice at the third timepoint.

Furthermore, in a case in which the length of the second phrase voice is shorter than a time interval from the third timepoint to the fourth timepoint, the playback control means may perform loop playback of the second phrase voice at least until the fourth timepoint.

The length of the second phrase voice does not necessarily coincide with the length of a loop designated by a user. In this case, by setting the entire loop length with a user's instruction prioritized, playing that better follows the user's intention can be performed.

In addition, the determination means may determine an ending timepoint in a case in which there is an instruction different from any one of the instructions determining the first to fourth timepoints, and the playback control means may stop the loop playback at the ending timepoint.

Furthermore, a third phrase voice may be stored in advance, and the playback control means may start playback of the third phrase voice at the ending timepoint.

According to such a configuration, playing can be ended at an arbitrary timepoint. The third phrase voice, for example, may be set as a phrase corresponding to an ending.

In addition, the determination means may acquire an instruction determining the third timepoint and an instruction determining the ending timepoint from operations performed by the user on one operator and determine one of the third timepoint and the ending timepoint on the basis of an operation form for the one operator.

The operation form, for example, is a single push, a double push, a long push, or the like but is not limited thereto. By distinguishing operations on the basis of different forms, a plurality of instructions can be performed using a single interface.

Furthermore, the present invention may be identified as a recording/playback device including at least some of the means described above. In addition, the present invention may also be identified as a recording/playback method performed by the recording/playback device. In addition, the present invention may be identified as a program used for performing the recording/playback method described above or a non-transitory storage medium having the program recorded thereon. The processes and the means described above may be freely combined unless a technical contradiction occurs.

BRIEF DESCRIPTION OF DRAWINGS

FIG. 14 is a flowchart illustrating a synchronization process between a rhythm track and a user track.

DESCRIPTION OF EMBODIMENTS

First Embodiment

A recording/playback device 100 according to this embodiment is a device that records an input musical sound signal and plays back the musical sound signal. In addition, the recording/playback device 100 sets a loop section on the basis of an operation performed by a user (player) and repeatedly performs recording and playback of a musical sound signal for the loop section. Recording can be also performed newly, and a new musical sound signal can overlap (also called mixing, overdubbing, or the like) a recorded musical sound signal.

The recording/playback device 100 according to this embodiment has two functions including a function of a looper performing recording and playback of an input musical sound signal and a function of a rhythm machine performing loop playback of a rhythm pattern recorded in advance. A track used by the looper (a track performing recording and playback of an input musical sound signal) will be referred to as a user track, and a track used by a rhythm machine (a track for playing back a rhythm pattern) will be referred to as a rhythm track. The recording/playback device 100 is a device that enables diversified performance by synchronizing progress of the user track and progress of the rhythm track with each other.

Before specific description, a relation between a rhythm track and a user track will be described.

Figure 2:
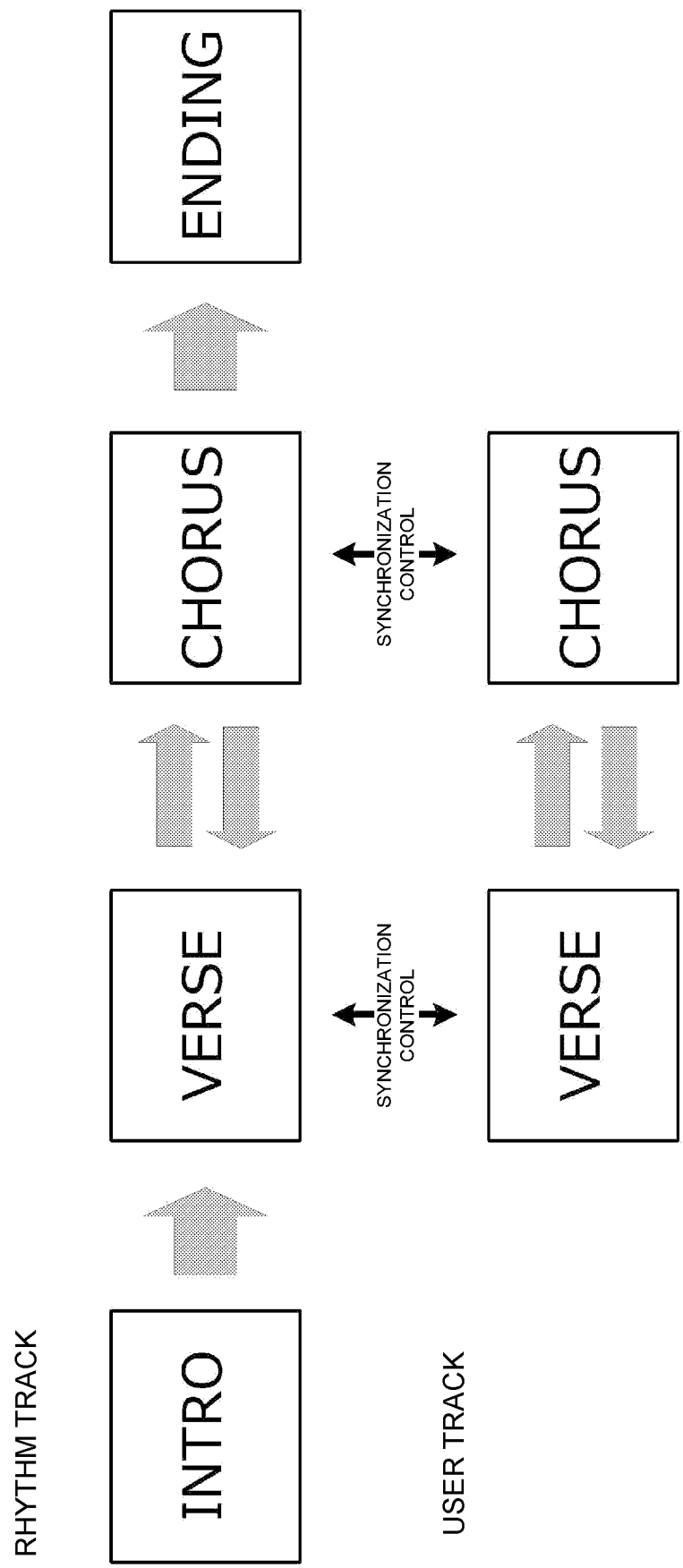
FIG. 2 is a diagram illustrating a relation between a rhythm track and a user track handled by a recording/playback device.

FIG. 2 is a diagram illustrating a relation between a rhythm track and a user track handled by the recording/playback device 100 according to this embodiment.

Figure 3:
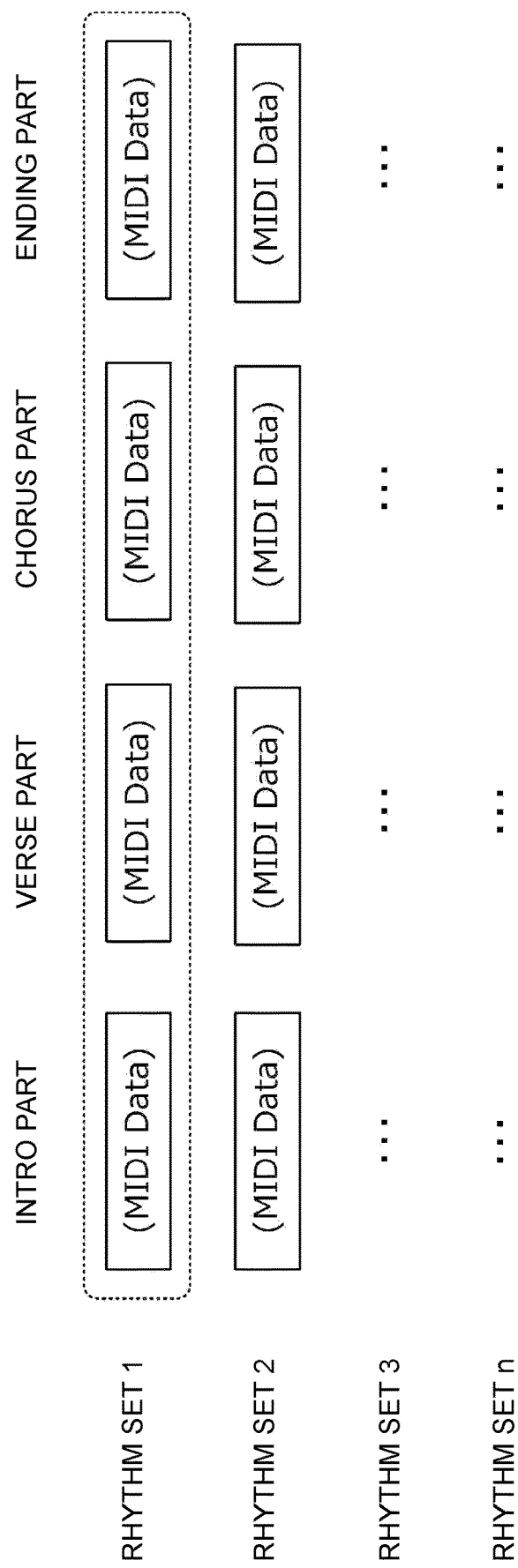
FIG. 3 is a diagram illustrating a rhythm pattern recorded in a device.

The rhythm track is a track for playing back a rhythm pattern composed of percussion and the like. The rhythm track, as illustrated in the drawing, plays back a rhythm pattern corresponding to one of an intro part, a verse part, a chorus part, and an ending part (arrows in the drawing illustrate transition directions). The recording/playback device 100, as illustrated in FIG. 3, stores a plurality of rhythm patterns corresponding to sections (more specifically, MIDI data) and plays back a pattern selected by a user.

The user track is a track for recording a musical sound played by a user and performs loop playback. In the user track, two parts including a verse part and a chorus part can be independently recorded and played back.

The recording/playback device 100 according to this embodiment performs a transition between sections and synchronization between tracks on the basis of timepoints instructed by a user. A detailed operation will be described below.

Figure 4:
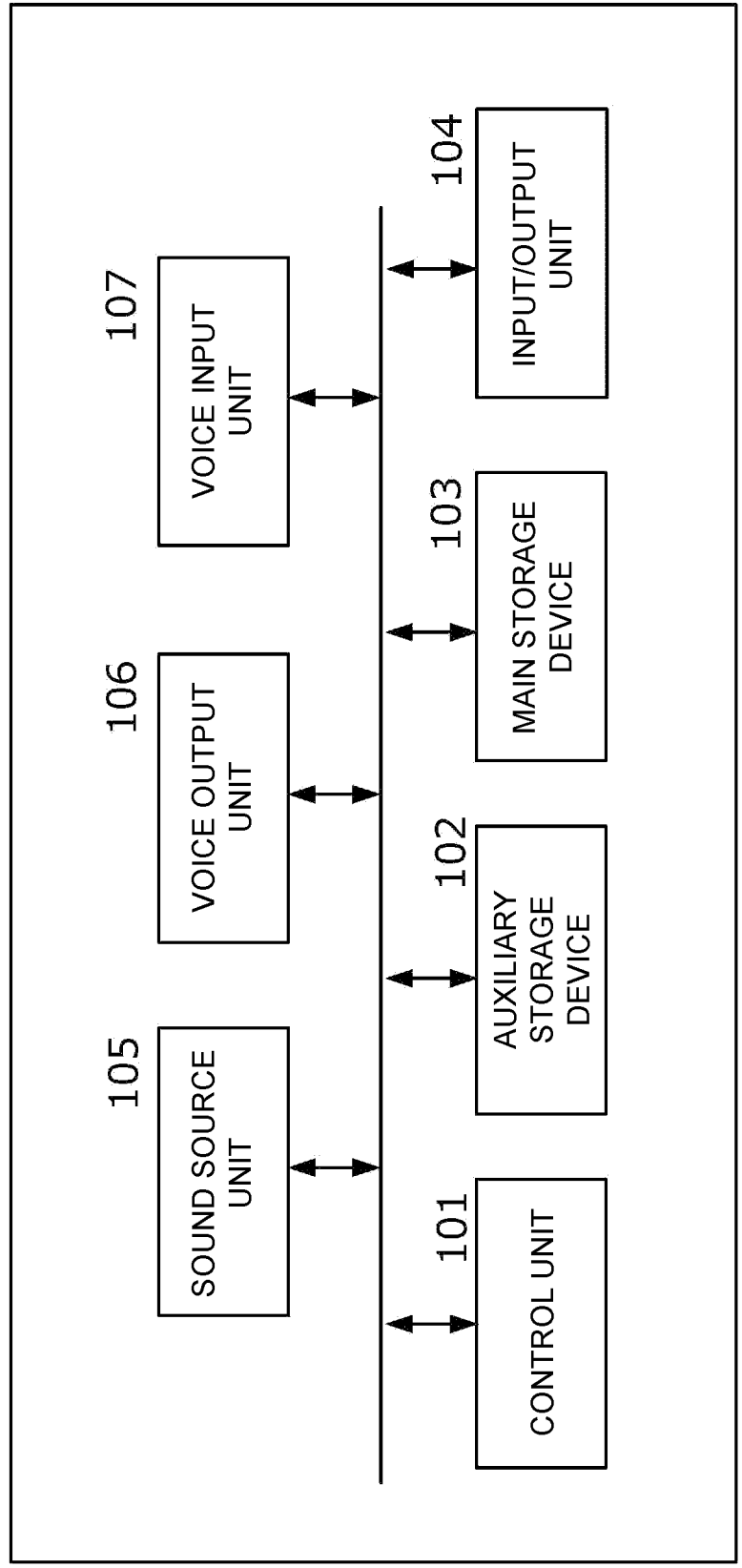
FIG. 4 is a hardware configuration diagram of a recording/playback device according to an embodiment.

FIG. 4 is a hardware configuration diagram of the recording/playback device 100 according to this embodiment. The recording/playback device 100 according to this embodiment is configured to include a control unit 101, an auxiliary storage device 102, a main storage device 103, an input/output unit 104, a sound source unit 105, a voice output unit 106, and a voice input unit 107.

The control unit 101 is an arithmetic operation device (CPU) responsible for control performed by the recording/playback device 100. More specifically, the control unit performs control for performing loop playback of the rhythm track, control for performing recording and loop playback of the user track, control for synchronizing progresses of the rhythm track and the user track, and the like. The control unit 101 corresponds to a recording means, a playback means, a determination means, a recording control means, and a playback control means.

The auxiliary storage device 102 is a rewritable nonvolatile memory. In the auxiliary storage device 102, a control program executed by the control unit 101 and data used by the control program are stored. In addition, in the auxiliary storage device 102, a musical sound signal acquired by the recording/playback device 100 is recorded. The musical sound signal is read and played back in accordance with an instruction from the control unit 101.

The main storage device 103 is a memory in which a control program executed by the control unit 101 and data used by the control program are expanded. A program stored in the auxiliary storage device 102 is loaded into the main storage device 103 and is executed by the control unit 101, whereby a process described below is performed. In addition, the main storage device 103 temporarily stores a musical sound signal acquired by the recording/playback device 100.

The input/output unit 104 includes a plurality of interface devices that present information to a user and accept operations from a user. The input/output unit 104 includes a means corresponding to an operator.

The input/output unit 104, for example, is configured to include a display device outputting information relating to a state of the device. In addition, the input/output unit 104, for example, is configured to include an input device that performs designation of a volume and a tempo, selection of a rhythm pattern played back in the rhythm track, and the like.

Furthermore, the input/output unit 104 is configured to include an interface (for example, a foot switch or the like) used by a user for instructing a device of a timepoint.

Figure 5:
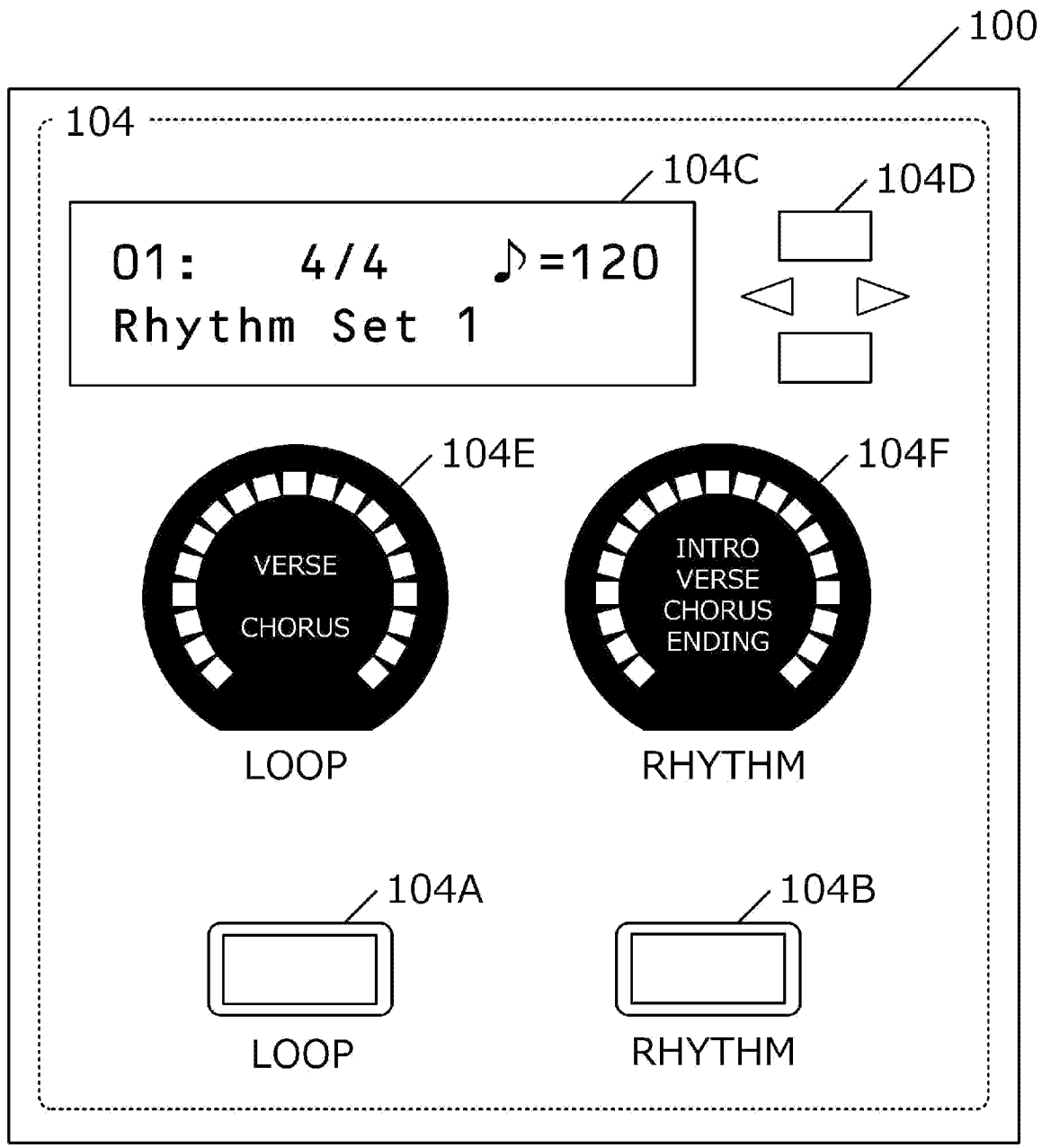
FIG. 5 is a diagram illustrating an outward appearance of a recording/playback device 100.

FIG. 5 is a diagram illustrating an outward appearance of the recording/playback device 100 according to this embodiment.

In this embodiment, the input/output unit 104 is configured to include a loop switch 104A, a rhythm switch 104B, a display unit 104C, an operation button 104D, a loop indicator 104E, and a rhythm indicator 104F.

The loop switch 104A and the rhythm switch 104B are foot switches operated by a user using her or his feet and are used for performing control respectively for the user track and the rhythm track. Details of the control will be described below.

The display unit 104C is a liquid crystal display that displays the current setting details. For example, the name of a selected rhythm set, information relating to a rhythm and a tempo that are set, and the like are displayed on the display unit 104C.

The operation button 104D is a physical key used for performing various settings.

The loop indicator 104E is an indicator that indicates a current state of the user track. The loop indicator 104E is configured to include a lamp indicating a section (verse/chorus) for which recording/playback is performed and a lamp indicating the current position in the loop.

The rhythm indicator 104F is an indicator that indicates a current state of the rhythm track. The rhythm indicator 104F is configured to include a lamp indicating a section (intro/verse/chorus/ending) that is played back and a lamp indicating the current position in the loop.

The description will be continued with reference back to FIG. 3.

The sound source unit 105 is a unit that converts MIDI data into a musical sound signal and outputs the musical sound signal. The musical sound signal generated by the sound source unit 105 is supplied to the voice output unit 106.

The voice output unit 106 is an interface that outputs a musical sound signal. A digital signal output from the control unit 101 is converted into an analog signal by a D/A converter and emits a sound through an amplifier, a speaker, or the like.

The voice input unit 107 is an interface that inputs a musical sound signal. The input musical sound signal is converted into a digital signal by an A/D converter and is supplied to the control unit 101.

Next, functional blocks included in the control unit 101 will be described with reference to FIG. 6.

The control unit 101 is configured to include functional blocks including a rhythm track control unit 1011, a user track control unit 1012, and a synchronization control unit 1013. Such functional blocks may be realized by corresponding program modules executed by the CPU.

The rhythm track control unit 1011 performs playback of the rhythm track. The rhythm track control unit 1011 corresponds to a rhythm machine. More specifically, the rhythm track control unit 1011 acquires MIDI data corresponding to a rhythm set selected by a user from the auxiliary storage device 102 and performs playback of the musical sound using the sound source unit 105 in accordance with details (the tempo and the like) set in advance.

The user track control unit 1012 performs recording and playback of the user track. The user track control unit 1012 corresponds to a looper. More specifically, the user track control unit 1012 sets a loop section on the basis of a timepoint designated by a user and repeatedly performs recording or playback of the input musical sound for the loop section as a target. Recording may be performed a plurality of times, and a plurality of recorded phrases are individually stored. In accordance with this, loop playback of the plurality of recorded phrases through mixing can be performed.

In addition, the user track control unit 1012 can independently perform recording/playback processes for two parts including the verse part and the chorus part. In other words, the user track control unit 1012 includes two logical loopers and can perform switching therebetween on the basis of a user's instruction.

The synchronization control unit 1013 synchronizes the progress of the rhythm track and the progress of the user track with each other. More specifically, the synchronization control unit 1013 acquires information relating to transition timepoints between sections (timepoint information) from the rhythm track control unit 1011 and notifies the user track control unit 1012 of the acquired timepoint information. In accordance with this, sections in which play is performed can be synchronized for both of the tracks.

In addition, the synchronization control unit 1013 acquires information relating to a loop length (loop length information) designated by a user from the user track control unit 1012 and notifies the rhythm track control unit 1011 of the acquired loop length information. In accordance with this, a rhythm phrase can be played back in accordance with the loop length desired by the user.

Next, a method for playing back the rhythm track that is performed by the rhythm track control unit 1011 will be described.

Figure 7:
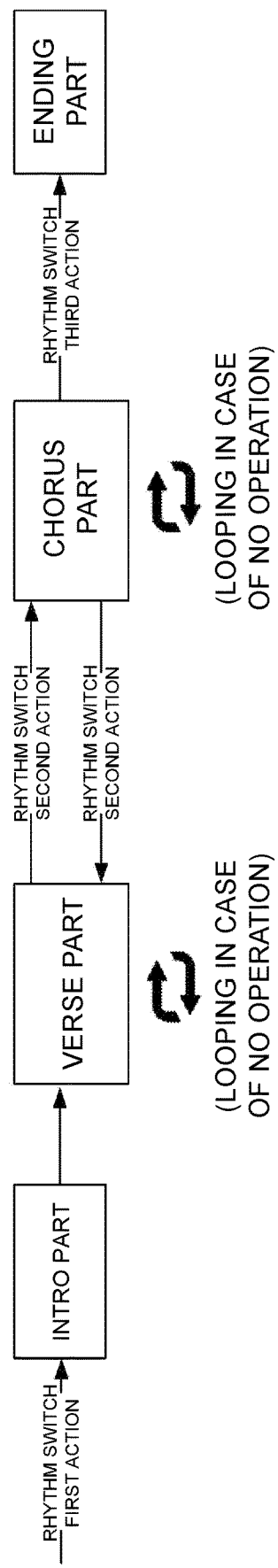
FIG. 7 is a diagram illustrating a playback process for a rhythm track that is performed by a rhythm track control unit.

FIG. 7 is a diagram illustrating transitions between sections in the rhythm track. The rhythm track control unit 1011 sequentially performs playback of MIDI data corresponding to the intro part, the verse part, the chorus part, and the ending part along the flow illustrated in the drawing.

In addition, it is assumed that the setting of the tempo, the selection of the rhythm set, and the like are completed in advance. In the following description, an operation of pressing a switch once will be referred to as a first action, an operation of pressing a switch for a long time will be referred to as a second action, and an operation of pressing a switch twice within a predetermined time will be referred to as a third action. However, operation details need not be those of the example as long as operations can be distinguished from each other.

Figure 8:
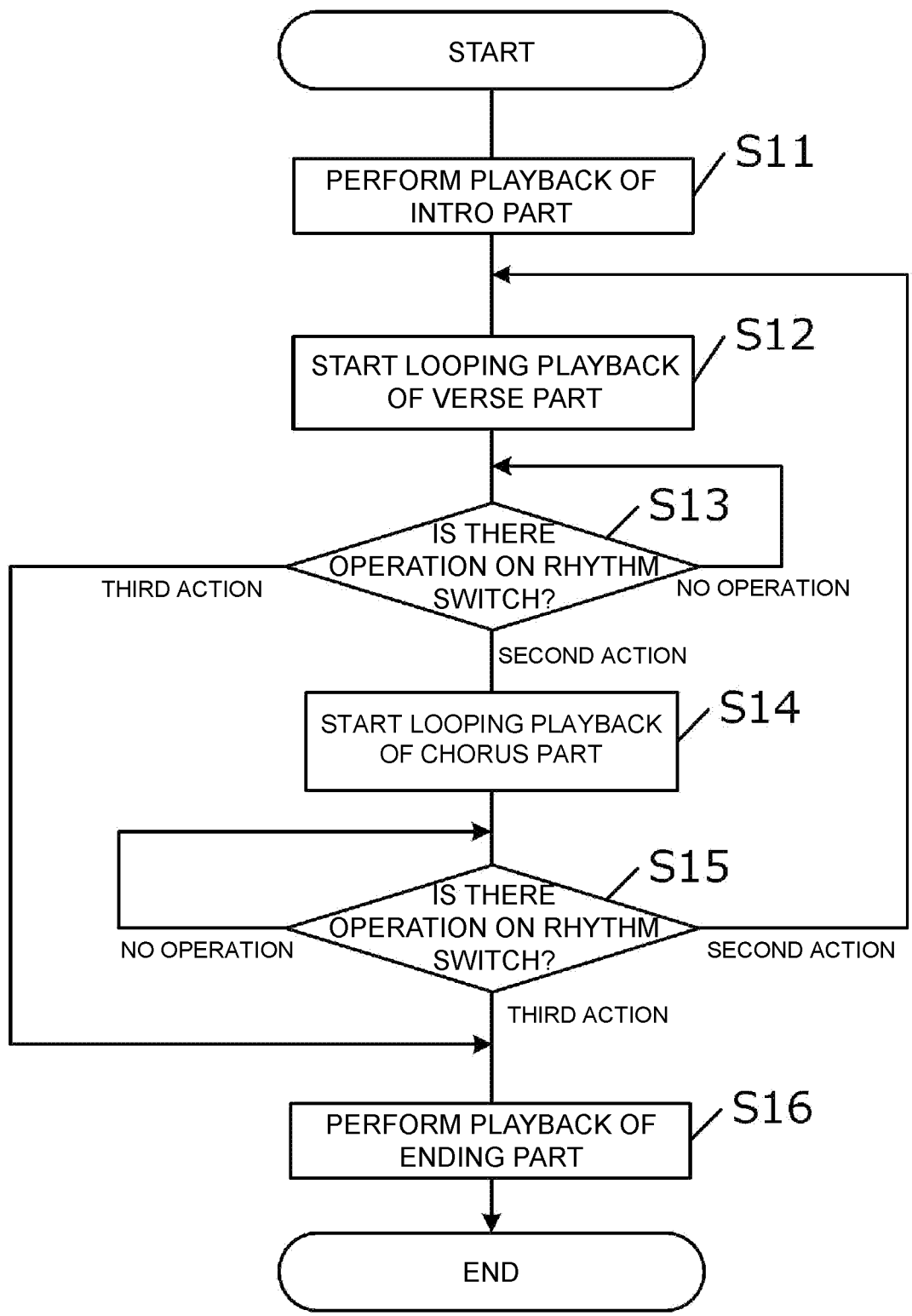
FIG. 8 is a flowchart of a process performed by the rhythm track control unit.

FIG. 8 is a flowchart of a process performed by the rhythm track control unit 1011.

In a case in which the first action of the rhythm switch 104B is detected, the rhythm track control unit 1011 reads MIDI data corresponding to the designated rhythm set and starts playback of the intro part using the sound source unit 105 in accordance with the set parameters (for example, the tempo and the like) (Step S11).

When the playback of the intro part is completed, the rhythm track control unit 1011 automatically starts playback of the verse part (Step S12).

During playback of the verse part, the rhythm track control unit 1011 monitors whether or not there has been an operation performed by a user on the rhythm switch 104B (Step S13).

In a case in which an operation on the rhythm switch 104B has not been performed by a user during playback of the verse part, the rhythm track control unit 1011 returns a playback pointer to the start of the verse part and continues the playback. In other words, in a case in which a user has not performed an operation, loop playback of the verse part is performed.

During playback of the verse part, in a case in which the second action on the rhythm switch 104B has been detected, the rhythm track control unit 1011 waits for completion of the playback of the verse part and starts playback of the chorus part (Step S14).

During the playback of the chorus part, the rhythm track control unit 1011 monitors whether or not there has been an operation performed by a user on the rhythm switch 104B (Step S15).

In a case in which an operation on the rhythm switch 104B has not been performed by a user during the playback of the chorus part, the rhythm track control unit 1011 returns the playback pointer to the start of the chorus part and continues the playback. In other words, in a case in which a user has not performed an operation, loop playback of the chorus part is performed.

During the playback of the chorus part, in a case in which the second action on the rhythm switch 104B has been detected, the rhythm track control unit 1011 waits for completion of the playback of the chorus part and starts playback of the verse part. In other words, the process is caused to transition to Step S12.

During the playback of the verse part or the chorus part, in a case in which the third action on the rhythm switch 104B has been detected, the rhythm track control unit 1011 waits for completion of the playback of the verse part or the chorus part and starts playback of the ending part. In other words, the process is caused to transition to Step S16.

When the playback of the ending part is completed, the rhythm track control unit 1011 stops the playback of the rhythm track.

Next, a method for recording/playback of the user track that is performed by the user track control unit 1012 will be individually described.

Figure 9:
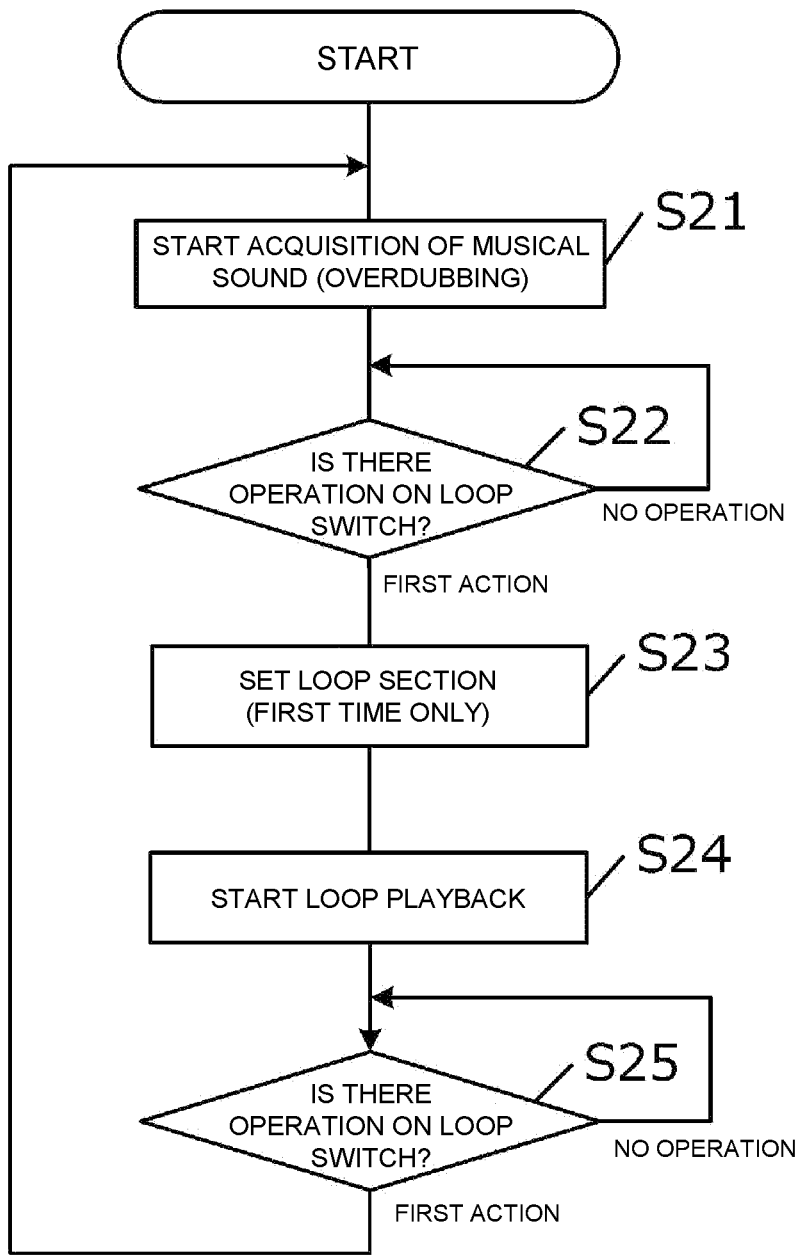
FIG. 9 is a flowchart of a process performed by a user track control unit.
Figure 10:
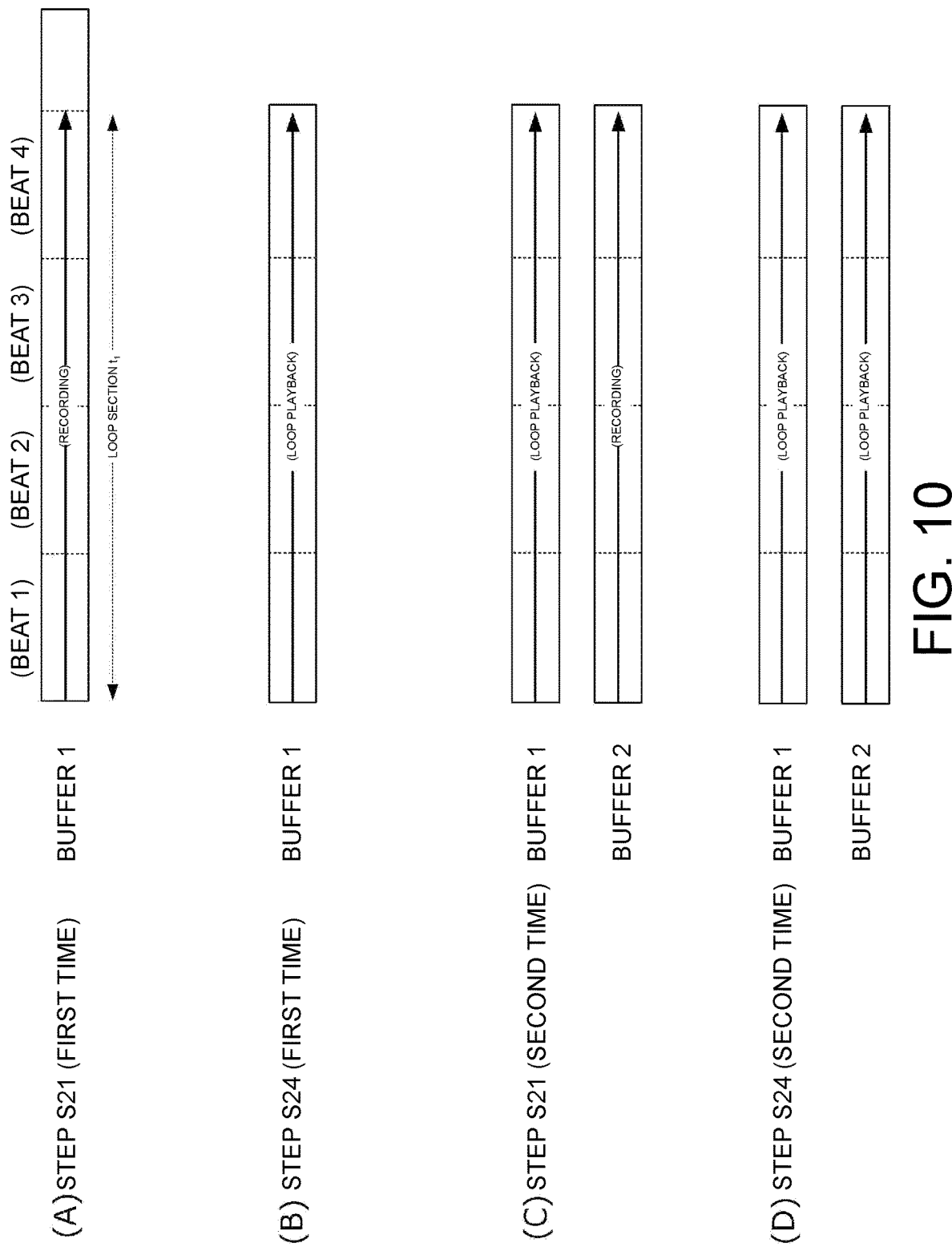
FIG. 10 is a diagram illustrating a state of a buffer during recording and during playback.
Figure 11:
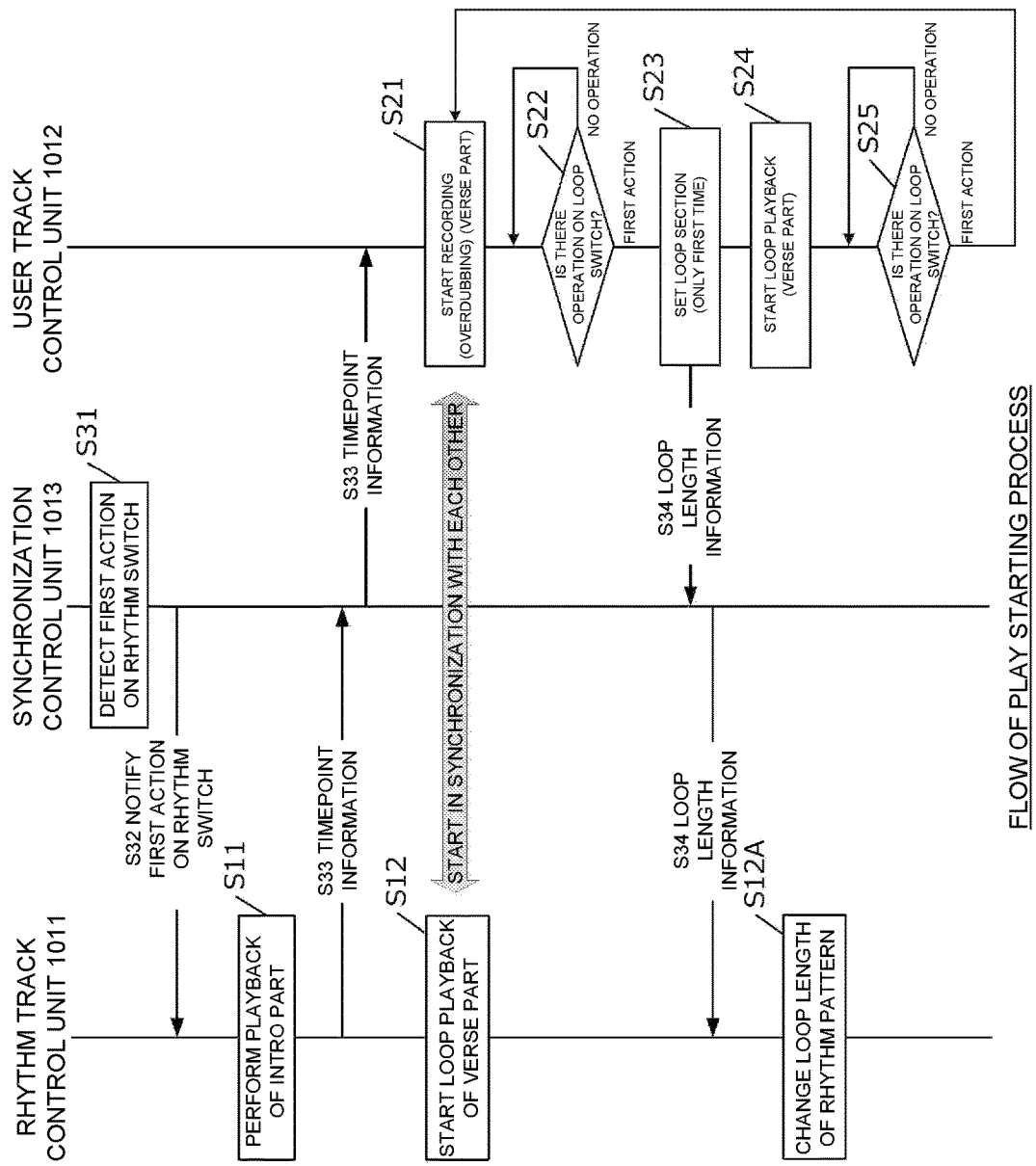
FIG. 11 is a flowchart illustrating a synchronization process between a rhythm track and a user track.

FIG. 9 is a flowchart of a process performed by the user track control unit 1012. FIG. 10 is a diagram illustrating a state of a buffer during recording and during playback.

As described above, although the user track control unit 1012 can individually perform recording/playback processes of two parts including the verse part and the chorus part, for the simplification of description, here, only common operations will be described.

When a start trigger is detected, the user track control unit 1012 starts a phase in which recording is performed and starts to acquire a musical sound signal from the voice input unit 107 (Step S21). The acquired musical sound signal, as illustrated in (A) of FIG. 10, is stored in the main storage device at any time.

During recording, the user track control unit 1012 monitors whether or not there has been an operation performed by a user on the loop switch 104A (Step S22).

During recording, in a case in which the first action on the loop switch 104A has been detected, the user track control unit 1012 stores the acquired musical sound signal. In the case of the example illustrated in FIG. 10, the recorded musical sound signal is stored in a buffer 1. A musical sound signal stored for each loop section is also called play data.

Next, the user track control unit 1012 sets a loop section on the basis of a timepoint at which the first action on the loop switch 104A has been detected (Step S23). In the case of the illustrated example, a loop section having a length $t_1$ is set.

In addition, when the loop section is set, quantization may be performed. For example, a timepoint at which a beat arrives is determined on the basis of tempo information set in advance, and a section up to a timepoint at which a beat arrives after the first action on the loop switch 104A may be set as a loop section.

When a musical sound signal is stored in the buffer, the user track control unit 1012 proceeds to a phase in which stored details of the buffer are played back (Step S24). In accordance with this, as illustrated in (B) of FIG. 10, a user can check details of playing that has been previously performed.

During playback, the user track control unit 1012 monitors whether or not there has been an operation performed by a user on the loop switch 104A (Step S25).

During playback, in a case in which an operation on the loop switch 104A has not been performed by the user, the user track control unit 1012 returns the playback pointer to the start of the buffer and continues the playback. In other words, in a case in which the user has not performed an operation, loop playback of details of the buffer 1 is performed.

During playback, in a case in which the first action on the loop switch 104A has been detected, the user track control unit 1012 waits for completion of playback of the buffer that is currently being played back and causes the process to transition to Step S21 and starts overdubbing.

The overdubbing represents a process of overlapping a new musical sound with a recorded musical sound.

In the process of Step S21 for the second time, the user track control unit 1012 records a new musical sound signal while playing back details of the buffer (the buffer 1) that have been recorded ((C) of FIG. 10). In the overdubbing, similar to (A) of FIG. 10, although an acquired musical sound signal is stored in the main storage device at any time, the details of the buffer that has been recorded in the looping of the first time are not changed.

Even during the overdubbing, the user track control unit 1012 monitors whether or not there has been an operation performed by the user on the loop switch 104A (Step S22).

During overdubbing, in a case in which the first action on the loop switch 104A has been detected, the user track control unit 1012 stores the stored musical sound signal in a new buffer (a buffer 2) and proceeds to a playback phase (Step S24).

In looping of the second time and a subsequent time (a phase in which overdubbing is performed), the process of Step S23 is skipped.

In a case in which the playback phase (Step S24) has been started in a state in which a plurality of buffers are present, the user track control unit 1012 mixes details of the plurality of buffers and outputs the mixed details. In the example illustrated in (D) of FIG. 10, details of the buffer 1 that have been recorded by recording of the first time and details of the buffer 2 that have been recorded by recording of the second time are mixed and output.

In this way, the user track control unit 1012 can record a musical sound in an overlapping manner for the set loop section and play back the musical sound.

As above, the method for playing back the rhythm track that is performed by the rhythm track control unit 1011 and the method for recording/playback of the user track that is performed by the user track control unit 1012 have been described.

Each of the rhythm track control unit 1011 and the user track control unit 1012 can independently perform the process described above.

Figure 6:
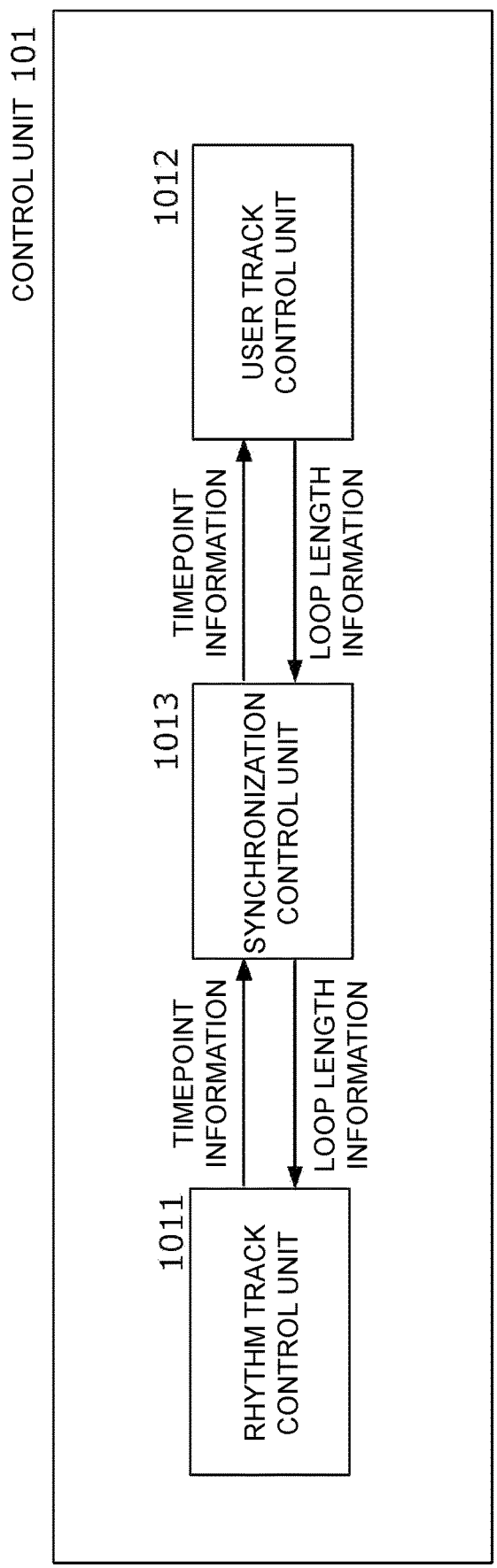
FIG. 6 is a diagram illustrating functional blocks included in a control unit 101.

In addition to this, in the recording/playback device according to this embodiment, as illustrated in FIG. 6, the synchronization control unit 1013 performs the process of synchronizing the rhythm track and the user track with each other.

The synchronization control unit 1013 achieves the role of sharing a transition timepoint between sections between the rhythm track control unit 1011 and the user track control unit 1012. For example, by notifying the user track control unit 1012 of a timepoint at which the rhythm track transitions from the intro part to the verse part, recording of the user track can be started at a timepoint at which playback of the rhythm pattern (the verse part) starts.

In addition, the synchronization control unit 1013 achieves the role of causing the loop lengths to coincide with each other between the rhythm track and the user track. In the user track, a loop having a length desired by a user can be generated, and thus, in a case in which the user track and the rhythm track are played back at the same time, the length of the rhythm pattern needs to coincide with the loop length designated by the user.

Synchronization between the rhythm track and the user track and a relation between an operation performed by a user and an operation in each track will be described with reference to FIG. 1. In the following description, the rhythm track control unit 1011 and the user track control unit 1012 operate in cooperation with the synchronization control unit 1013. A method for being in cooperation with each other will be described below with reference to FIGS. 11 to 14, and here, an overview will be described.

As described above, the user track control unit 1012 can individually perform the process illustrated in FIG. 9 for both the verse part and the chorus part. A buffer set corresponding to the verse part and a buffer set corresponding to the chorus part are stored in different areas in a memory (a first area and a second area). In accordance with this, a transition between the verse part and the chorus part can be performed at a timepoint designated by a user.

In the drawing, t1 to t7 represent timepoints at which the user performs operations.

t1 is a timepoint at which the user performs a first operation. At this timepoint, the rhythm track control unit 1011 starts to play back the intro part. When the playback of the intro part ends, the user track control unit 1012 starts recording of the verse part. This timepoint is a first timepoint. In other words, the first timepoint can be regarded as a timepoint set on the basis of the first operation.

Figure 1:
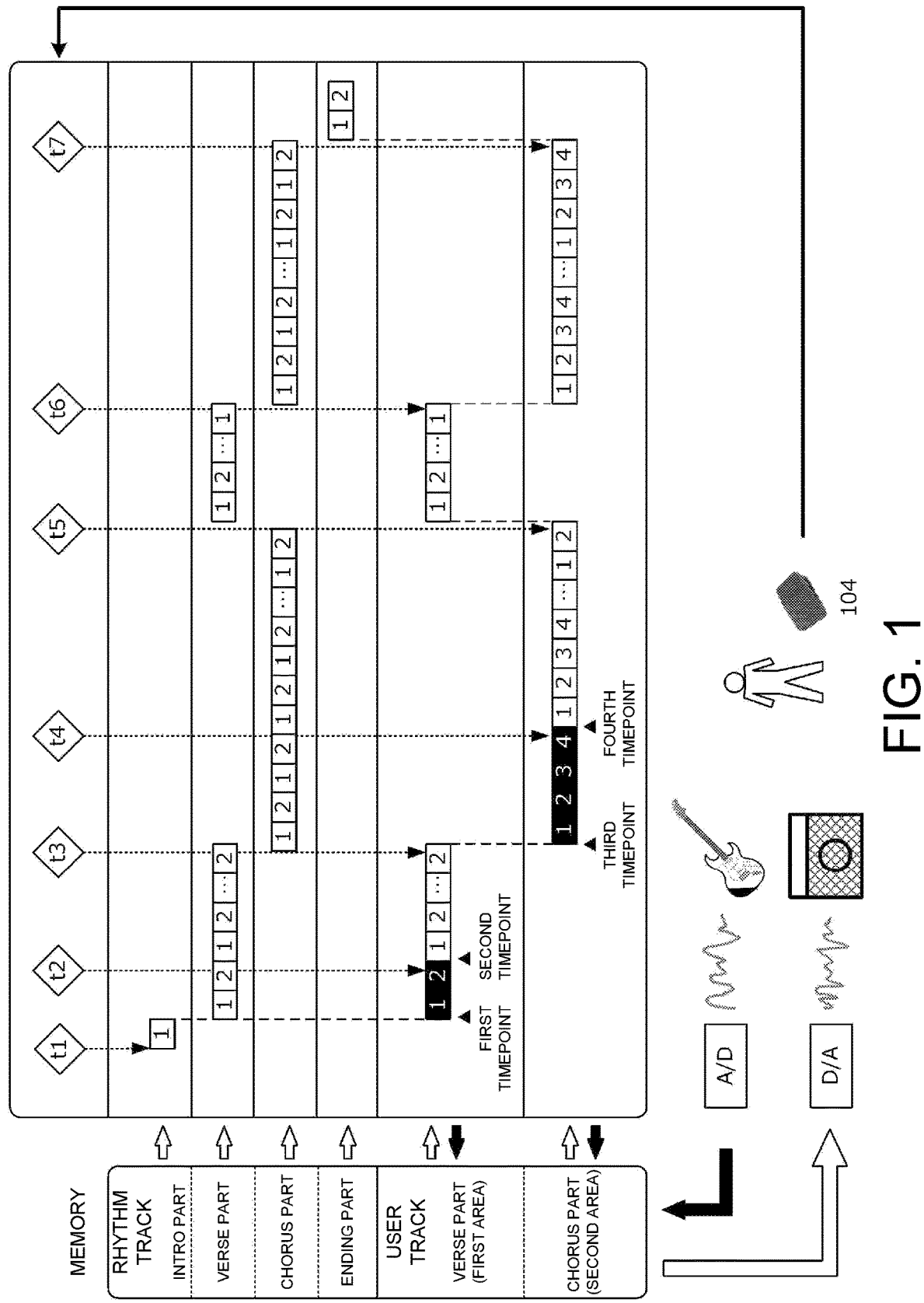
FIG. 1 is a diagram illustrating a relation between operations performed by a user and transition timepoints of a process.

In FIG. 1, a box in which a number is written represents a rhythm. A box on a black background represents a recording operation, and a box on a white background represents a playback operation.

A phase in which the verse part is recorded (a first phase) continues from the first timepoint to a second timepoint. The second timepoint is a timepoint set on the basis of the second operation (t2) and, in this embodiment, as described in Step S22, is set using the first action on the loop switch as a trigger.

When it becomes the second timepoint, the user track control unit 1012 stores musical sound signals (a buffer corresponding to the verse part) acquired from the first timepoint to the second timepoint in the first area inside the memory.

From the second timepoint, a phase in which playback of the verse part is performed (a second phase) is started. In the second phase, for the buffer set stored in the first area as a target, as described in Step S24, loop playback is started.

The second phase is continued up to a third timepoint. The third timepoint is a timepoint set on the basis of a third operation (t3) and, in this embodiment, as described in Step S25, is set using the first action on the loop switch as a trigger. When it becomes the third timepoint, playback of the verse part ends, and a phase in which recording of the chorus part is performed (a third phase) is started. At this time, an area which the buffer set is read from and is written into is switched from the first area to the second area.

In addition, in a case in which overdubbing is performed, return from the second phase to the first phase may be performed. In this case, the first timepoint is set on the basis of the first operation. When it becomes the first timepoint, the playback of the verse part ends, and a phase in which recording of the verse part is performed (first phase) is started.

The phase in which recording of the chorus part is performed (third phase) is continued up to a fourth timepoint. The fourth timepoint is a timepoint set on the basis of the fourth operation (t4) and, in this embodiment, as described in Step S22, is set using the first action on the loop switch as a trigger. When it becomes the fourth timepoint, musical sound signals (a buffer corresponding to the chorus part) acquired from the third timepoint to the fourth timepoint are stored in the second area inside the memory.

From the fourth timepoint, a phase in which playback of the chorus part is performed (fourth phase) is started. In the fourth phase, for the buffer set stored in the second area as a target, as described in Step S24, loop playback is started.

In a case in which there has been a fifth operation (t5) in the fourth phase, the user track control unit 1012 sets the first timepoint.

When it becomes the first timepoint in the fourth phase, the loop playback of the chorus part ends, and a phase in which recording of the verse part is performed (first phase) is started. At this time, an area which the buffer set is read from and is written into is switched from the second area to the first area.

In addition, in a case in which overdubbing is performed, return from the fourth phase to the third phase may be performed. In this case, the third timepoint is set on the basis of the third operation. When it becomes the third timepoint, the playback of the chorus part ends, and a phase in which recording of the chorus part is performed (third phase) is started.

In addition, in a case in which a musical sound signal has already been recorded in a target area inside the memory in the first and third phases, playback may be started with recording skipped. In other words, the second phase may be started with the first phase skipped, and the fourth phase may be started with the third phase skipped.

At a timepoint t5 illustrated in the drawing, the user track control unit 1012 starts the second phase, in other words, loop playback of the verse part. Thereafter, when there is a third operation (t6), the user track control unit 1012 starts a fourth phase, in other words, looping playback of the chorus part.

When there is an operation (t7) for ending a play, the user track control unit 1012 stops playback, and the rhythm track control unit 1011 playbacks the ending part at a timepoint synchronized with this, and the play ends.

The process described above will be described in more detail.

FIGS. 11 to 14 are diagrams illustrating relations between the rhythm track control unit 1011 and the user track control unit 1012 and the synchronization control unit 1013. Steps performed by the rhythm track control unit 1011 and the user track control unit 1012 correspond to those described with reference to FIGS. 8 and 9.

When a user presses (performs the first operation on) the rhythm switch 104B, the synchronization control unit 1013 detects this operation (Step S31) and notifies the rhythm track control unit 1011 of the first action on the rhythm switch 104B being present (Step S32). The rhythm track control unit 1011 that has received the notification starts the process illustrated in FIG. 8 and starts playback of the intro part (Step S11).

Next, the rhythm track control unit 1011 transmits information including a start timepoint of the verse part (timepoint information) to the user track control unit 1012 through the synchronization control unit 1013, which is information used for a notification of occurrence of a transition from the intro part to the verse part (Step S33).

A timepoint at which recording of the verse part starts can be determined on the basis of a timepoint at which playing of the intro part ends. The timepoint is, for example, generated by the control unit 101 and can be designated using a clock shared by the rhythm track control unit 1011 and the user track control unit 1012.

Next, the rhythm track control unit 1011 starts looping playback of the verse part (Step S12). In addition, at a timepoint synchronized with this, the user track control unit 1012 starts recording of the verse part (Step S21). The synchronized timepoint represents that timepoints of beats in tracks coincide with each other. During recording, a metronome sound may be output in accordance with a tempo set in advance.

When recording in the user track starts, as described in Step S22, the user track control unit 1012 waits for an operation on the loop switch 104A.

When the first action on the loop switch 104A is detected, the user track control unit 1012 determines a length $t_1$ of the loop section (Step S23). At this time, the user track control unit 1012 transmits information representing the determined length $t_1$ of the loop (loop length information) to the rhythm track control unit 1011 through the synchronization control unit 1013 (Step S34).

Here, the loop length will be described.

In a synchronization mode, the rhythm track and the user track simultaneously progress. In other words, it is necessary to set the length of the loop to be the same in both the tracks. However, the length of a rhythm pattern played back for the rhythm track and the length of the loop desired by a user do not necessarily coincide with each other.

Figure 12:
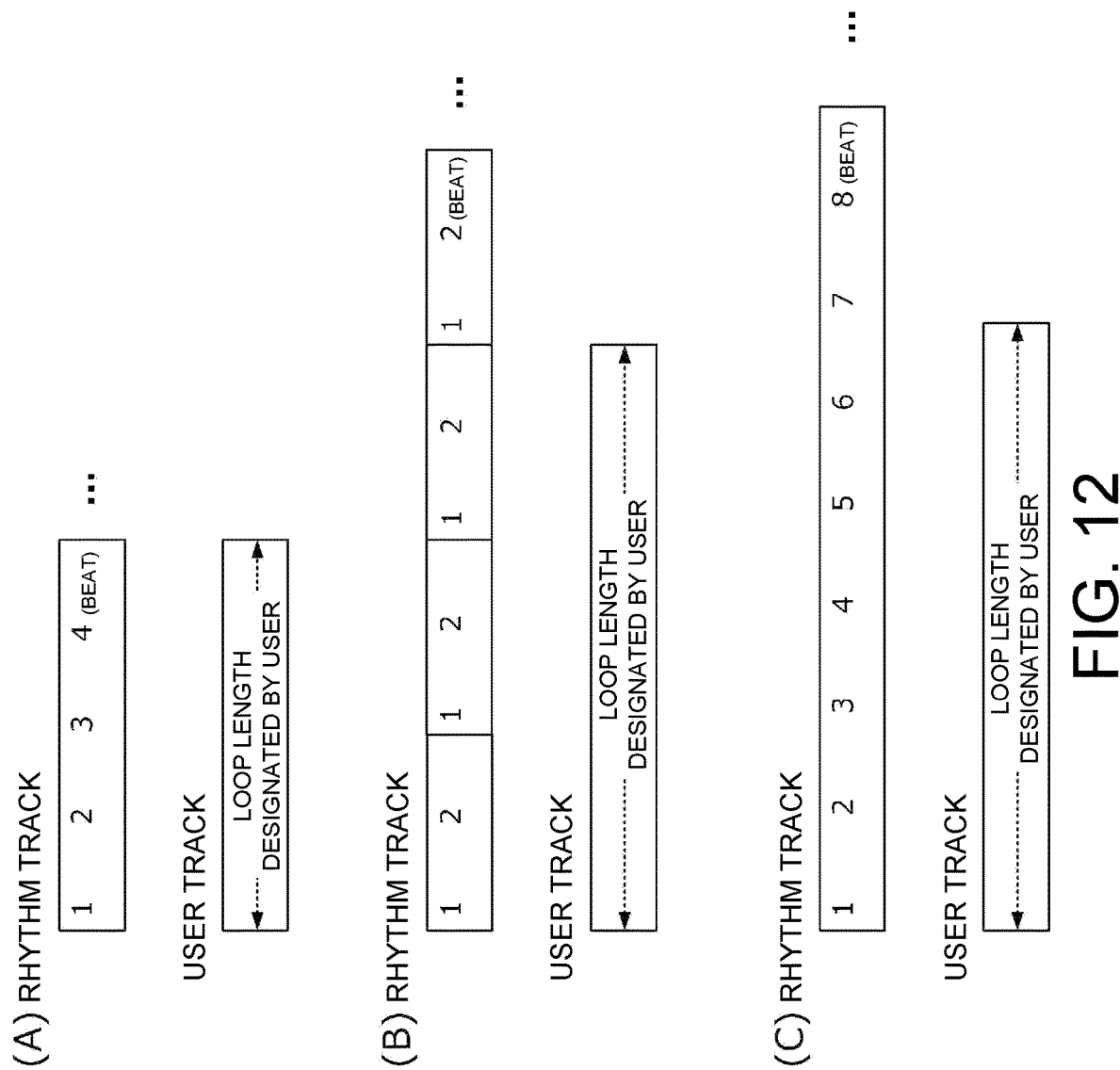
FIG. 12 is a diagram illustrating a relation between a loop length designated by a user and a rhythm pattern.

FIG. 12 is a diagram illustrating a relation between a rhythm pattern played back in a rhythm track and a loop length designated by a user at the time of recording a user track.

(A) of FIG. 12 is a diagram illustrating a case in which a rhythm pattern that is looping played back has four beats, and the loop length designated by a user is a length corresponding to the four beats. In this case, the lengths of both the parties are the same, and thus, the rhythm track control unit 1011 may perform loop playback of the pattern of four beats as it is.

(B) of FIG. 12 is a diagram illustrating a case in which a rhythm pattern that is looping played back has two beats, and the loop length designated by a user is a length corresponding to six beats. In this case, the rhythm track may repeat three sets of the pattern of two beats. In other words, the rhythm track control unit 1011 performs loop playback of the rhythm pattern using six beats as one unit.

(C) of FIG. 12 is a diagram illustrating a case in which a rhythm pattern that is looping played back has eight beats, and the loop length designated by a user is a length corresponding to six beats. In this case, the rhythm track cuts the pattern of eight beats in the middle and performs loop playback of the rhythm pattern using six beats as one unit.

In this way, in this embodiment, the rhythm track control unit 1011 changes the loop length of the rhythm pattern on the basis of the loop length designated by the user.

In a case in which the loop length designated by the user does not coincide with the loop length of the rhythm pattern, the rhythm track control unit 1011 changes the loop length of the rhythm pattern on the basis of the designated loop length. In accordance with this, playing according to the intention of a user (player) can be performed.

In a case in which the loop length designated by a user approximately coincides with the loop length of the rhythm pattern, the loop length of the rhythm pattern may not be changed.

In any of the cases, quantization may be performed at the time of determining the length of the loop section such that the user track waits for a musical timepoint (for example, a timepoint coinciding with beats) represented by the rhythm track and performs looping.

The rhythm track control unit 1011 that has received the loop length information transmitted in Step S34 changes the loop length of the rhythm pattern corresponding to a verse part on the basis of the loop length information (Step S12A). In this way, the loop length in the tracks of the two parties can be caused to coincide with each other.

When transmission of the loop length information is completed, the user track control unit 1012 causes the process to transition to Step S24.

When loop playback starts in Step S24, the user track control unit 1012, as described above, waits for an operation on the loop switch 104A.

When the first action on the loop switch 104A is detected, the user track control unit 1012, as described above, causes the process to transition to Step S21. In accordance with this, overdubbing starts.

In addition, in a case in which recording (overdubbing) of the second time or a subsequent time is performed, the processes of Steps S23, S34, and S12A are skipped. The reason for this is that the length of the loop section has already been determined.

In addition, in a case in which a musical sound signal corresponding to the verse part has already been recorded in Step S21, by causing the process to transition to Step S24, the process from the loop playback may start.

Next, the process of switching between the verse part and the chorus part will be described with reference to FIG. 13.

In a case in which the synchronization control unit 1013 detects the second action (in other words, an operation of performing switching between the verse part and the chorus part) on the rhythm switch 104B (Step S35), the synchronization control unit 1013 notifies the rhythm track control unit 1011 of the presence of the operation (Step S36). In accordance with this, the rhythm track control unit 1011 starts loop playback of the chorus part through the determination of Step S13 (Step S14).

In synchronization with this, the rhythm track control unit 1011 transmits information including a start timepoint of the chorus part (timepoint information) to the user track control unit 1012 through the synchronization control unit 1013, which is information used for a notification of an occurrence of a transition from the verse part to the chorus part (Step S37).

The start timepoint of the chorus part can be determined on the basis of a timepoint at which the play of the verse part ends. A method for designating a timepoint may be similar to Step S33.

The user track control unit 1012 starts recording of the chorus part at a timepoint synchronized with a timepoint at which the rhythm track transitions to the chorus part (Step S21B).

In addition, in a case in which a musical sound signal corresponding to the chorus part has already been recorded in Step S21B, by causing the process to transition to Step S24B, the process from the loop playback may be configured to start.

In this way, in a case in which there has been the second action on the rhythm switch 104B, the recording/playback device according to this embodiment waits for a musical timepoint (for example, a timepoint coinciding with a beat) represented by the rhythm track and performs a transition between sections in each of the rhythm track and the user track.

The processes of Steps S21B to S25B are the same as those of Steps S21 to S25 except that the target is not the verse part but the chorus part, and thus detailed description thereof will be omitted.

Figure 13:
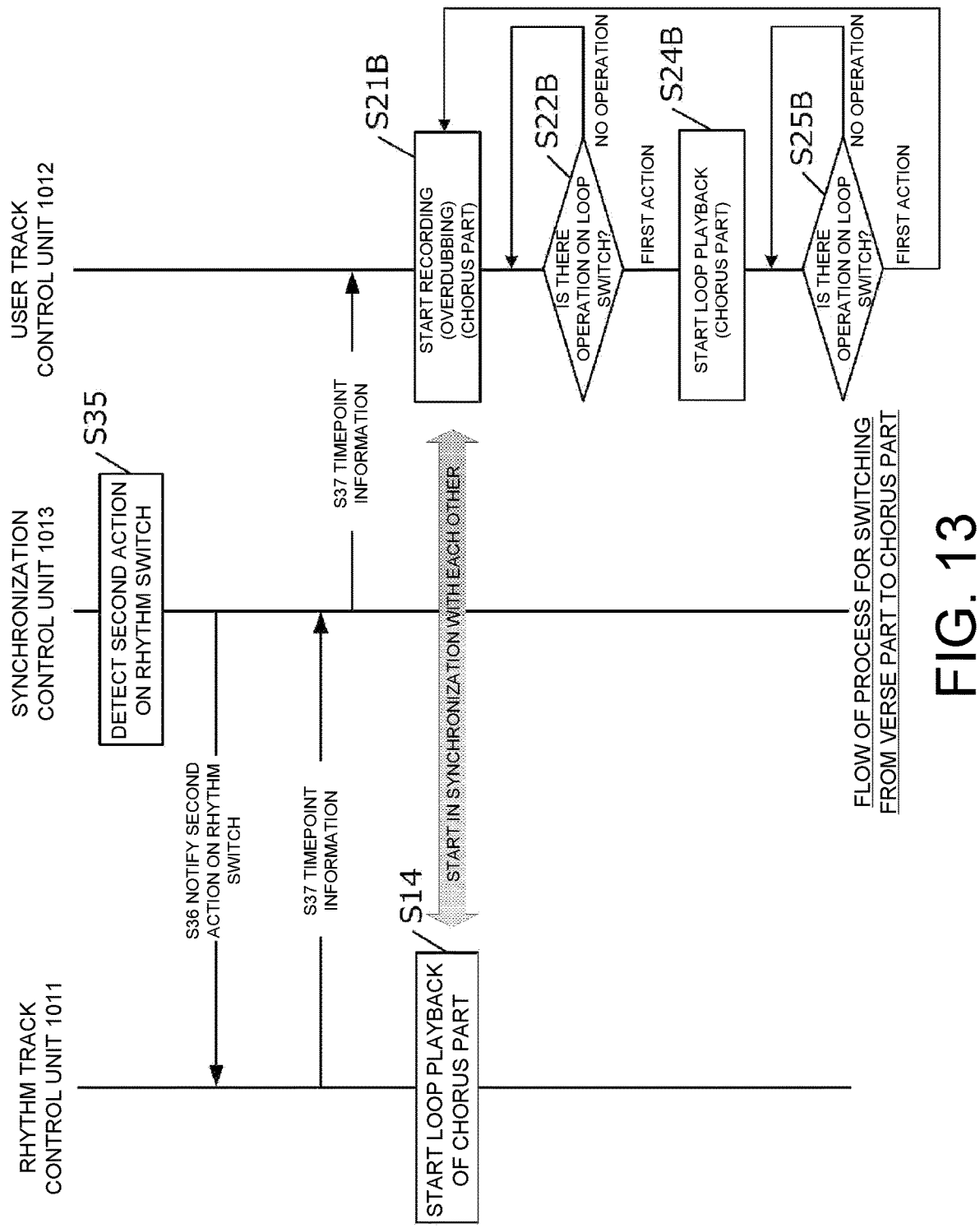
FIG. 13 is a flowchart illustrating a synchronization process between a rhythm track and a user track.

As above, although switching from the verse part to the chorus part has been described, also switching from the chorus part to the verse part is performed in the same flow as that illustrated in FIG. 13. In this case, "chorus part" may be substituted with "verse part".

Next, the process of ending the play will be described with reference to FIG. 14.

During recording/playback of the chorus part, in a case in which the synchronization control unit 1013 has detected the third action (in other words, an operation for instruction for ending the play) on the rhythm switch 104B (Step S38), the synchronization control unit 1013 notifies the user track control unit 1012 of the end of the play (Step S39). In accordance with this, the user track control unit 1012 stops the process illustrated in FIG. 9, waits for the end of the loop, and ends the process (Step S26).

In addition, the synchronization control unit 1013 notifies the rhythm track control unit 1011 of the presence of the operation (Step S40). In accordance with this, after completion of playback of the chorus part through the determination of Step S15, the rhythm track control unit 1011 starts playback of the ending part (Step S16).

As described above, the recording/playback device 100 according to this embodiment enables a transition between the verse part and the chorus part in each of the rhythm track and the user track and synchronizes start timepoints thereof. In this way, a rhythm function can be given to a conventional looper, and diverse plays can be performed.

In addition, a loop length designated by a user is applied also to the rhythm track. In this way, a musical piece can progress in accordance with player's intention.

Modified Example 1

In the first embodiment, in a case in which the third action on the rhythm switch 104B has been detected, the rhythm track control unit 1011 waits for completion of loop playback in the chorus part and performs playback of the ending part. However, depending on a playing form, there are cases in which a transition to the ending part is desired without waiting for completion of playback of the loop. In order to respond to this, a timepoint at which a transition to the ending part is performed may be changed.

Examples of a transition timepoint from the chorus part to the ending part include the following.

(1) After detection of the third action, a transition to the ending part is immediately performed.

(2) After detection of the third action, a transition to the ending part is performed at a timepoint at which the next beat arrives.

(3) After detection of the third action, a transition to the ending part is performed at a timepoint at which loop playback is completed.

Such options may be provided for a user to allow the user to designate one of the operations to be performed through the input/output unit 104.

Modified Example 2

In the first embodiment, although the first action on the rhythm switch 104B is set as an operation for instruction for starting playing, after start of playing, the first action on the rhythm switch 104B may be assigned to another function. For example, during playback of the verse part or the chorus part, in a case in which the first action on the rhythm switch 104B has been detected, an improvised rhythm pattern (fill-in) stored in advance may be inserted.

Modified Example 3

In addition, the first action, the second action, and the third action (first to fourth operations) on the rhythm switch 104B may be configured to be able to be freely assigned to arbitrary functions in accordance with user's preference. For example, functions such as "playback of fill-in", "switching between the verse part/the chorus part", and "a transition to the ending part" may be configured to be able to be assigned to respective actions.

In addition, also for the loop switch 104A, an arbitrary function may be configured to be able to be assigned to each of the first action, the second action, and the third action". For example, the first action may be "switching between the verse part and the chorus part", and the second action may be "un-do/re-do". The recording/playback device 100, as illustrated in FIG. 10, stores a plurality of pieces of play data in different buffers, and thus the buffers can be erased at an arbitrary timepoint, and the play can be performed again.

Other Modified Example

The embodiments described above are merely examples, and the present invention can be performed with appropriate changes in a range not departing from the concept.

For example, processing and means described in the present disclosure can be freely combined as long as there is no technical contradiction.

In addition, in description of the embodiment, although the rhythm track and the user track are synchronized with each other by the synchronization control unit 1013, the operation of the synchronization control unit 1013 may be paused, and each track may be independently controlled. For example, a mode in which the rhythm track and the user track are synchronized with each other (synchronous mode) and a mode in which synchronization is not performed (asynchronous mode) may be provided, and switching between the modes may be configured to be able to be performed.

A user may be allowed to perform switching between the synchronous mode and the asynchronous mode. For example, switching between the synchronous mode and the asynchronous mode may be performed on the basis of an operation performed through the input/output unit 104 (104D).

In addition, a process described to be performed by one device may be performed with being shared between a plurality of devices. Alternatively, processes described to be performed by different devices may be performed by one device. In a computer system, a certain hardware configuration (server configuration) realizing each function can be flexibly changed.

The present invention can be also realized by supplying a computer program implementing the functions described in the embodiment described above to a computer and one or more processors included in the computer reading and executing the program. Such a computer program may be provided for the computer using a non-transitory computer-readable storage medium that can be connected to a system bus of the computer or may be provided for the computer through a network. The non-transitory computer-readable storage medium, for example, includes a disc of an arbitrary type such as a magnetic disk (a floppy (registered trademark) disk, a hard disk drive (HDD), or the like) or an optical disc (a CD-ROM, a DVD disc, a Blue-ray disc, or the like) and a medium of an arbitrary type that is appropriate for storing electronic commands such as a read only memory (ROM), a random access memory (RAM), an EEPROM, an EEPROM, a magnetic card, a flash memory, or an optical card.

The invention claimed is:

1. A recording/playback device comprising:
a processor configured to:
store input voices;
play back the stored voices;
determine timepoints as triggers using instructions that are sequentially acquired;
record a voice input between a first timepoint and a second timepoint as a first voice and record a voice input between a third timepoint and a fourth timepoint as a second voice; and
start loop playback of the first voice from the second timepoint, stop the loop playback of the first voice at the third timepoint, and start loop playback of the second voice from the fourth timepoint,
wherein a first phrase voice having a predetermined length is stored in advance, and
wherein the processor determines the first timepoint on the basis of the acquired instruction and the length of the first phrase voice.

2. The recording/playback device according to claim 1, wherein the processor acquires operations, as the instructions, performed by a user on an operator.

3. The recording/playback device according to claim 1, wherein the processor, at a fifth timepoint, stops the loop playback of the second voice and starts the loop playback of the first voice.

4. The recording/playback device according to claim 1, wherein the processor records a voice input during the loop playback of the first voice as a third voice at least until the loop playback of the first voice is performed once.

5. The recording/playback device according to claim 1,
wherein a second phrase voice having a predetermined length is stored in advance, and
wherein the processor starts playback of the second phrase voice at the third timepoint.

6. The recording/playback device according to claim 5, wherein, in a case in which the length of the second phrase voice is shorter than a time interval from the third timepoint to the fourth timepoint, the processor performs loop playback of the second phrase voice at least until the fourth timepoint.

7. The recording/playback device according to claim 1,
wherein the processor determines an ending timepoint in a case in which there is an instruction different from any one of the instructions determining the first to fourth timepoints, and
wherein the processor stops the loop playback at the ending timepoint.

8. The recording/playback device according to claim 7,
wherein a third phrase voice is stored in advance, and
wherein the processor starts playback of the third phrase voice at the ending timepoint.

9. The recording/playback device according to claim 7, wherein the processor acquires an instruction determining the third timepoint and an instruction determining the ending timepoint from operations performed by a user on one operator and determines one of the third timepoint and the ending timepoint on the basis of an operation form for the one operator.

10. A recording/playback method comprising:
storing input voices;
playing back the stored voices;
determining timepoints, as triggers, by using instructions that are sequentially acquired;
recording a voice input between a first timepoint and a second timepoint as a first voice and recording a voice input between a third timepoint and a fourth timepoint as a second voice; and
starting loop playback of the first voice from the second timepoint, stopping the loop playback of the first voice at the third timepoint, and starting loop playback of the second voice from the fourth timepoint,
wherein a first phrase voice having a predetermined length is stored in advance, and
wherein the step of determining timepoints, as triggers, by using instructions that are sequentially acquired further comprises determining the first timepoint on the basis of the acquired instruction and the length of the first phrase voice.

11. The recording/playback method according to claim 10, wherein the step of determining timepoints, as triggers, by using instructions that are sequentially acquired further comprises acquiring operations, as the instructions, performed by a user on an operator.

12. The recording/playback method according to claim 10, wherein the step of starting loop playback of the first voice from the second timepoint, stopping the loop playback of the first voice at the third timepoint, and starting loop playback of the second voice from the fourth timepoint further comprises, at a fifth timepoint, stopping the loop playback of the second voice and starts the loop playback of the first voice.

13. The recording/playback method according to claim 10, wherein the step of recording a voice input between a first timepoint and a second timepoint as a first voice and recording a voice input between a third timepoint and a fourth timepoint as a second voice further comprises recording a voice input during the loop playback of the first voice as a third voice at least until the loop playback of the first voice is performed once.

14. The recording/playback method according to claim 10,
wherein a second phrase voice having a predetermined length is stored in advance, and
wherein the step of starting loop playback of the first voice from the second timepoint, stopping the loop playback of the first voice at the third timepoint, and starting loop playback of the second voice from the fourth timepoint further comprises starting playback of the second phrase voice at the third timepoint.

15. The recording/playback method according to claim 14, wherein, in a case in which the length of the second phrase voice is shorter than a time interval from the third timepoint to the fourth timepoint, the step of starting loop playback of the first voice from the second timepoint, stopping the loop playback of the first voice at the third timepoint, and starting loop playback of the second voice from the fourth timepoint further comprises performing loop playback of the second phrase voice at least until the fourth timepoint.

16. The recording/playback method according to claim 10,
wherein the step of determining timepoints, as triggers, by using instructions that are sequentially acquired further comprises determining an ending timepoint in a case in which there is an instruction different from any one of the instructions determining the first to fourth timepoints, and
wherein the step of starting loop playback of the first voice from the second timepoint, stopping the loop playback of the first voice at the third timepoint, and starting loop playback of the second voice from the fourth timepoint further comprises stopping the loop playback at the ending timepoint.

17. The recording/playback method according to claim 16,
wherein a third phrase voice is stored in advance, and
wherein the step of starting loop playback of the first voice from the second timepoint, stopping the loop playback of the first voice at the third timepoint, and starting loop playback of the second voice from the fourth timepoint further comprises starting playback of the third phrase voice at the ending timepoint.

18. The recording/playback method according to claim 16, wherein the step of determining timepoints, as triggers, by using instructions that are sequentially acquired further comprises acquiring an instruction determining the third timepoint and an instruction determining the ending timepoint from operations performed by a user on one operator and determining one of the third timepoint and the ending timepoint on the basis of an operation form for the one operator.

* * * * *